United States Patent
Cobb, Jr.

[11] Patent Number: 5,560,654
[45] Date of Patent: Oct. 1, 1996

[54] IRRIGANTION LAY FLAT PIPE HOLE PLUG

[76] Inventor: Clois Cobb, Jr., P.O. Box 442, Shallowater, Tex. 79363

[21] Appl. No.: 394,766

[22] Filed: Feb. 27, 1995

[51] Int. Cl.⁶ .................................................. F16L 41/00
[52] U.S. Cl. .............................. 285/5; 285/901; 285/260; 285/150; 138/94; 138/89
[58] Field of Search .............................. 285/5, 260, 901; 285/150; 138/89, 92, 94, 94.3

[56] References Cited

U.S. PATENT DOCUMENTS

| | | | |
|---|---|---|---|
| 2,148,419 | 2/1939 | Parker | 285/260 |
| 2,574,105 | 11/1951 | Janczak | 285/260 |
| 3,026,540 | 3/1962 | Barker | 285/260 |
| 3,129,020 | 4/1964 | Bujnowski | 285/260 |
| 3,233,627 | 2/1966 | Cebula | 285/5 |
| 3,490,791 | 1/1970 | Mitchell | 285/5 |
| 3,792,711 | 2/1974 | Bedard | 285/5 |
| 3,973,732 | 8/1976 | Diggs | 285/5 |
| 4,018,459 | 4/1977 | Moninee et al. | 285/5 |
| 4,128,107 | 12/1978 | Blumhardt | 138/94 |
| 4,676,530 | 6/1987 | Nordgren et al. | 285/901 |

Primary Examiner—Eric K. Nicholson
Attorney, Agent, or Firm—Jacobson, Price, Holman & Stern, PLLC

[57] ABSTRACT

A conventional plastic cap is provided incorporating a longitudinally tapering, generally cylindrical hollow body having opposite large and small diameter ends with the large diameter end being open and including a first diametrically outwardly projecting flange extending circumferentially thereabout and the small diameter end being closed and including a second diametrically outwardly projecting circumferential flange of greater outside diameter than the outside diameter of the large diameter end of the body independent of the first flange supported therefrom.

11 Claims, 1 Drawing Sheet

5,560,654

IRRIGANTION LAY FLAT PIPE HOLE PLUG

BACKGROUND OF THE INVENTION

1. Field of the Invention

This invention relates to a tapered hollow plug closed at one end and adapted to be inserted within a circular opening formed in a side wall portion of a flexible irrigation lay flat pipe for plugging that opening. The opposite ends of the plug include radially outwardly projecting circumferential flanges and the open, large diameter end of the plug and the flange supported therefrom are of radially inwardly deflectable whereby the large diameter end of the plug may be inserted inwardly through the lay flat pipe opening and thereafter released for return to its original shape in a manner plugging the opening, the large diameter end flange preventing outward expulsion of the plug from the opening and the closed smaller diameter end flange being provided to prevent lower than atmospheric pressure within the pipe from causing the plug to be displaced inwardly through the lay pipe opening into the pipe, as would be the case if the smaller diameter end circumferential flange was not provided.

2. Description of Related Art

Various different plugs for openings heretofore have been provided and it is the present practice in the irrigation lay flat pipe art to plug a circular opening within the side of a lay flat irrigation pipe by utilizing a tapered hollow plug closed at its small diameter end by an end wall and provided with a radially outwardly projecting circumferential flange on its open large diameter end. The plugs conventionally used in this manner comprise readily and inexpensively available thread protector plugs commonally telescoped over the threaded ends of prethreaded pipe sections being stored or shipped. These readily available plugs are manufactured in large numbers and are available in many areas. Accordingly, they are a welcome product for farmers to use in temporarily plugging side openings in irrigation lay flat pipes.

SUMMARY OF THE INVENTION

The tapered plug of the instant invention may be constructed identically to the above mentioned pipe thread protector, except that the closed small diameter end of the plug is also provided with a radially outwardly projecting circumferential flange, which additional circumferential flange on the small diameter end of the plug positively prevents a reduction of pressure within the lay flat pipe below atmospheric pressure from causing the plug to be projected inwardly through the associated opening of the lay flat pipe and into the interior of the pipe.

If an irrigation system powered by an electric motor experiences an interruption in electrical power, the water within the portion of the lay flat pipe having unobstructed openings therein will flow outwardly through the unrestricted openings and some times results in the pressure within the lay flat pipe dropping below ambient pressure such that any and all plugs being used to plug unused openings are forced inwardly through the associated side wall openings of the lay flat pipe. Then, when the supply of electrical current is again present, the water supply pump is actuated and water is again pumped into the lay flat pipe. However, since at least some of the plugs previously have been displaced inwardly of the lay flat pipe, water is discharged from the lay flat pipe not only through the previous unrestricted openings but also the previous restricted openings inwardly of which the associated plugs have been displaced.

Accordingly, a need exists for an inexpensive tapered plug for a side wall opening in a flexible lay flat pipe which includes structure preventing inward displacement of the plug through the associated side wall opening.

The main object of this invention is to provide an improved plug for a side wall opening in a flexible lay flat irrigation pipe.

Another object of this invention is to provide a plug in accordance with the preceding object and including structure which will prevent the plug from being displaced inwardly through the associated lay flat pipe side wall opening.

Another important object of this invention is to provide a lay flat pipe side wall opening plug which may be readily constructed of different sizes so as to be adaptable for use in conjunction with different size lay flat pipe side wall openings.

A final object of this invention to be specifically enumerated herein is to provide an improved hole plug for a lay flat irrigation pipe side wall opening which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
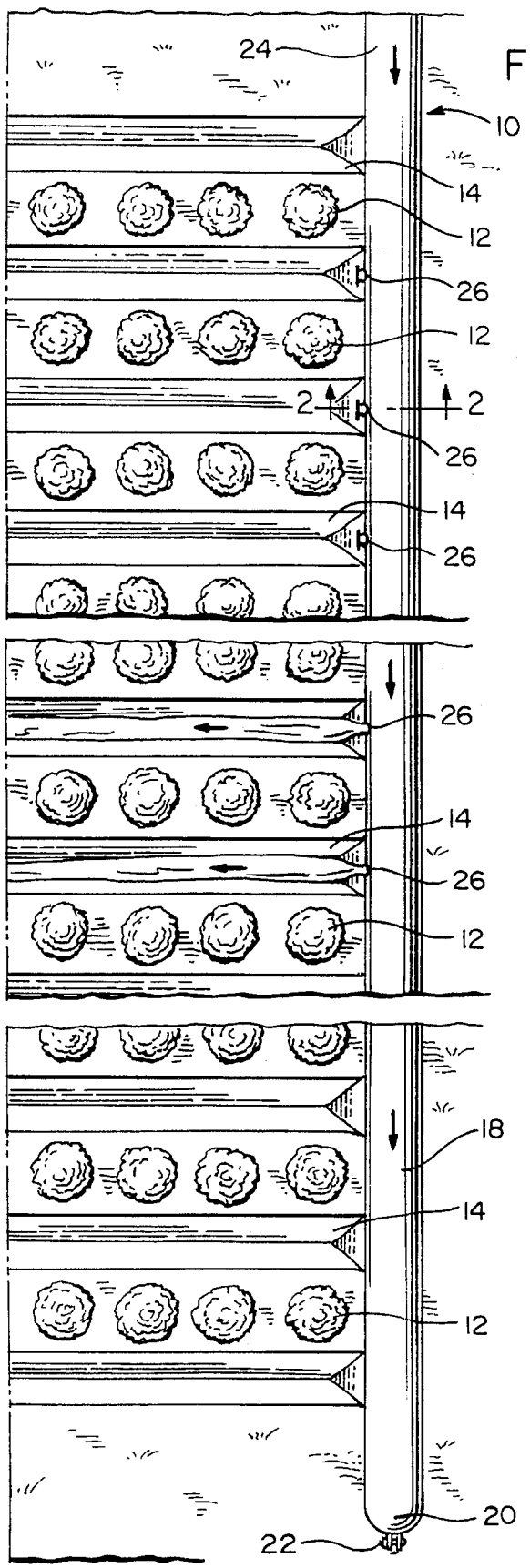
FIG. 1 is a fragmentary plan view of a typical lay flat irrigation pipe installation with three side wall openings in the lay flat pipe plugged in accordance with the present invention, two outlet openings in the pipe side wall being unrestricted to the flow of irrigation water therefrom and three furrows between adjacent row crops not having any side wall holes in the lay flat pipe registered therewith.

Referring now more specifically to the drawings the numeral 10 generally designates a field in which parallel crop rows have been formed with furrows 14 disposed between each pair of adjacent crop rows 12.

A berm area 16 extends along one set of corresponding ends of the crop rows 12 and furrows 14 and has a slight depression 18 formed therein. A conventional elongated, flexible lay flat pipe 18 is disposed in and extends along the depression 17. One end 20 of the pipe 18 is closed as at 22 and the other end 24 of the pipe 20 extends to a suitable low pressure source (not shown) of irrigation water.

Dependent upon the slope or levelness of the field 10 extending along the berm area 16, a certain number of the rows 12 are first selected for irrigation adjacent the end 24 of the pipe 18. The furrows 14 between adjacent rows 12 selected for irrigation have circular outlet openings 26 formed in the side wall 28 of the pipe 18 facing the selected furrows and in registry with the latter.

Figure 3:
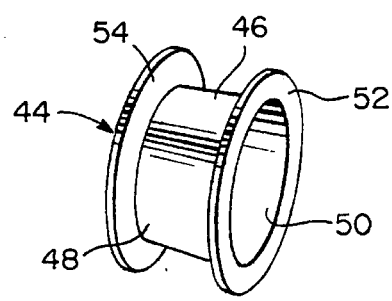
FIG. 3 is a prospective view of a preferred form of hole plug constructed in accordance with the present invention.
Figure 4:
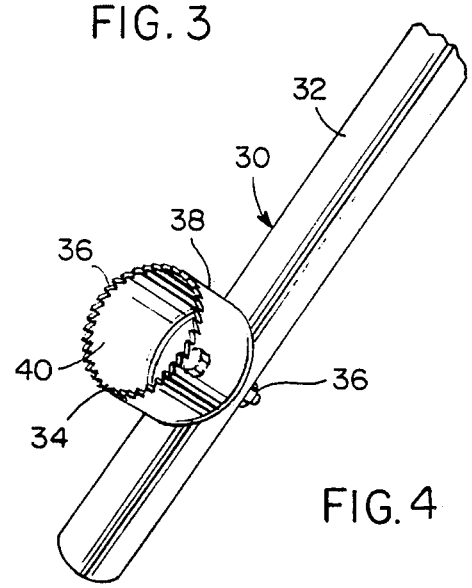
FIG. 4 is a fragmentary prospective view of a typical form of "slap" tool presently used to form circular side wall openings in a flexible lay flat pipe having water therein.

In order to form each opening 26 a "slap-type" tool referred to in general by the reference numeral 30, see FIG. 3, is provided. The tool 30 includes an elongated handle 32 and a modified hole cutting saw cup 34 is secured to the end of the handle 32 remote from the hand grip end (not shown) thereof through the utilization of a suitable fastener 36. The tool 30 is gripped at the hand grip end thereof and swung in a substantially vertical plane downward and toward the side wall 28 of the pipe 18 in an area of the side wall 28 registered with the selected furrows 14.

The hole saw cup 34 comprises a conventional hole saw cup which has been modified in a manner to remove those portions of the circumferential teeth 36 of the cup 34 which project radially outwardly of the outer surface 38 of the cup and which project radially inwardly of the inner surface 40 of the cup 34. This modification process may be carried out through the utilization of a grinding tool and/or file.

By impacting the side wall 28 of the pipe 18 with the modified cup 34 while water 42 is contained within the pipe 18, the flexible side wall 28 of the pipe 18 may have a smooth edge circular opening 26 formed therein. Of course, the size or diameter of the opening 26 is determined by the diameter of the cup 34 and different size openings will be used according to the length of the furrows 14 and also the slope or levelness thereof.

After the side wall 28 of the pipe 18 has a plurality of openings 26 formed therein in registry with the initially selected furrows 14, water 42 flows from the pipe 18 to irrigate the crop rows 12 between the initially selected furrows 14.

As the initial irrigation process of the initially selected crop rows 12 has been completed, plugs referred to in general by the reference numeral 44 are inserted in the openings 26 in order to plug the latter.

Figure 2:
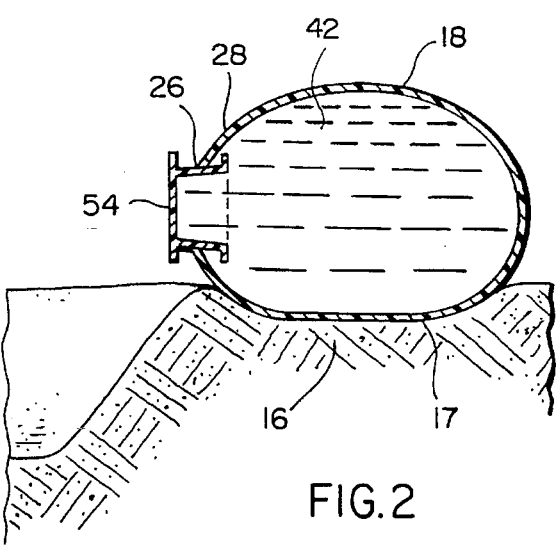
FIG. 2 is an enlarged fragmentary vertical sectional view taken substantially upon the plane indicated by the section line 2—2 of FIG. 1.

With reference more specifically to FIG. 2 of the drawings, the plugs 44 each include a longitudinally tapering, generally cylindrical hollow body 46 having small and large diameter ends 48 and 50. The end 50 is open and includes a radially outwardly circumferentially extending flange 52 and the end 48 is closed by an end wall 54.

The plug 44 as hereinabove described is constructed of a shape retentive, but deformable and resilient plastic material and the flange 52 and end wall 54 are formed integrally with the body 46. This construction is conventionally utilized on new threaded sections of pipe and is applied over the threaded ends of the pipe sections in order to protect the threads thereon during shipment and storage.

Hereinbefore, the plug 44, as above described, has been used in precisely the same manner illustrated in FIGS. 1 and 2. However, if the supply of water under low pressure to the lay flat pipe 18 is interrupted either intentionally or unintentionally, it is not uncommon for the above described conventional plug to be displace inwardly of the associated opening 26 into the interior of the pipe 18 due to pressure within the pipe 18 dropping below atmospheric pressure, such drop in pressure being a common occurrence when the supply of water 42 to the pipe 18 is cut off and water is allowed to flow outward of unobstructed openings 26 formed in the pipe 18.

In any event, after the first selected furrows 14 have been irrigated, plugs 44 are installed in the openings 26 previously utilized to irrigate the first selected furrows 14 and additional openings 26 are then formed in the side wall 28 through the use of the tool 30 in order to irrigate the next selected furrows 14 to be irrigated. Of course, this process is completed until such time as all of the furrows 14 have been irrigated. However, this irrigation process may take two or three days to complete with each day of irrigation experiencing multiple successive sets of adjacent furrow irrigations. Accordingly, during a single irrigation process over two or more days of time the supply of water 42 to the pipe 18 may be intentionally or unintentionally interrupted several times.

As each successive set of openings 26 spaced along the pipe 18 from the end 24 to the end 20 are closed through the utilization of the plugs 44, the next set of openings 26 are formed and this process continues until the crop rows 12 adjacent the end 20 of the pipe 18 have been irrigated.

In order to prevent the plugs 44 from being displaced inwardly of the associated openings 26, the small diameter ends 48 of the bodies 46 are provided with radially outwardly projecting circumferential flanges 54 which are appreciably larger in diameter than the associated openings 26. In this manner, any tendency of the plugs 44 to be displace inwardly of the openings 26 is prevented by contact of the axial faces of the flanges 54 opposing the flanges 52 with the outer surfaces of the side wall 28 disposed about the corresponding openings 26.

Although the plugs 44 may be loosened in the openings 26, as soon as the supply of water 42 under low pressure again builds up in the pipe 18, the greater internal pressure of fluid within the pipe 18 will reseat the large diameter ends 50 of the plugs 44 tightly in the openings 26.

Of course, once the entire length of the lay flat pipe 18 has had openings 26 formed therein and utilized throughout the irrigation process, the last used openings 26 may be plugged and the pipe 18, which may be up to one-quarter mile in length, may be transported to and used in a different irrigation area. In such case, the pipe 18 is positioned with the plugged openings 26 in registry with the furrows in the new irrigation area and selected plugs 44 then may be removed to initiate the new irrigation process.

By providing the plugs 44 with the flanges 54, plugs 44 are not lost in the interior of the pipe 18 when an irrigation process is interrupted and during transport of the pipe 18 from one location to another after first usage thereof.

However, neither flange 52 or flange 54 need extend fully circumferentially about the corresponding body end. Rather, at least the flange 52 could be interrupted at least once throughout its circumferential extent to thus enable it possible to "thread" the flange 52 inward through a corresponding opening 26.

The foregoing is considered as illustrative only of the principles of the invention. Further, since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination, a flexible plastic irrigation lay flat pipe of the type to be filled with low pressure water while disposed transversely of multiple side-by-side crop row ends and having circular irrigation water outlet openings of a predetermined diameter formed therein in registry with and opening downwardly along at least some of the furrows disposed between pairs of adjacent crop rows, a plug for at least one of said openings, said plug being constructed of shape retentive, but deformable and resilient material and including a longitudinally tapering, generally cylindrical hollow body having opposite large and small diameter ends, said large diameter end being open and including first diametrically outwardly projecting flange means positioned thereabout, said small diameter end being closed and including second diametrically outwardly projecting flange means positioned thereabout, said large diameter end being slightly larger in outside diameter than said predetermined diameter, said large diameter end and said first flange means being laterally radially inwardly displaceable for insertion of said large diameter end and said flange means thereon through one of said outlet openings from the exterior of said pipe and thereafter sufficiently resilient to at least substantially return to its original shape to thereby plug said one outlet opening and allow said first flange means to prevent said plug from being displaced outwardly through said one outlet opening, said second flange means being larger in outside diameter than said predetermined diameter and preventing full inward passage of said plug through said one outlet opening into the interior of said pipe.

2. The combination of claim 1 wherein said first flange means extends continuously about said open large diameter end.

3. The combination of claim 1 wherein said second flange means continuously about said small diameter end.

4. The combination of claim 3 wherein said first flange means extends continuously about said open large diameter end.

5. The combination of claim 1 wherein said body and flange means are integrally formed.

6. A plug for temporarily plugging a generally circular irrigation water outlet opening formed in a flexible lay flat pipe, said plug including a longitudinally tapering, generally cylindrical hollow body having opposite large and small diameter ends, said large diameter end being open and including first diametrically outwardly projecting flange means positioned thereabout, said small diameter end being closed and including second diametrically enlarged outwardly projecting flange means positioned thereabout, said large diameter end and said first flange means being laterally radially inwardly displaceable for insertion into said pipe through said water outlet opening from the exterior of said pipe and thereafter sufficiently resilient to at least substantially return to its original shape to thereby plug said outlet opening and allow said first flange means to prevent said plug from being displaced outwardly through said outlet opening, said second flange means being larger in outside diameter than said large diameter end to prevent full inward passage of said plug through said opening into the interior of said pipe.

7. The plug of claim 6 wherein said first flange means extends continuously about said open large diameter end.

8. The plug of claim 6 wherein said second flange means continuously about said small diameter end.

9. The plug of claim 8 wherein said first flange means extends continuously about said open large diameter end.

10. The plug of claim 6 wherein said body and flange means are integrally formed.

11. The method of plugging a circular irrigation water outlet opening formed in a flexible, plastic irrigation lay flat pipe; said method including providing a plug including a longitudinally tapering, generally cylindrical hollow body having opposite large and small diameter ends with said large diameter end being open and including a first diametrically outwardly projecting flange means disposed thereabout and said small diameter being closed and including second diametrically outwardly projecting flange means positioned thereabout, generally radially inwardly displacing said large diameter end and said first flange means at diametrically opposite sides of said large diameter end, inserting the deformed large diameter end through said opening, and releasing said large diameter end to enable the resiliency thereof to return said large diameter end and said first flange means to their original shape.

* * * * *